US008055715B2

(12) United States Patent
Bensky et al.

(10) Patent No.: US 8,055,715 B2
(45) Date of Patent: Nov. 8, 2011

(54) THREAD IDENTIFICATION AND CLASSIFICATION

(75) Inventors: Andrew Bensky, Scotts Valley, CA (US); Anesh Madapoosi, Sunnyvale, CA (US); Frederick Mueller, Los Altos Hills, CA (US); Joel Sarch, Belmont, CA (US); Magnus Stensmo, San Jose, CA (US); James Charles Williams, San Rafael, CA (US)

(73) Assignee: i365 MetaLINCS, Santa Clara, CA (US)

( * ) Notice: Subject to any disclaimer, the term of this patent is extended or adjusted under 35 U.S.C. 154(b) by 1293 days.

(21) Appl. No.: 11/128,935

(22) Filed: May 12, 2005

(65) Prior Publication Data

US 2006/0271630 A1 Nov. 30, 2006

Related U.S. Application Data

(60) Provisional application No. 60/649,395, filed on Feb. 1, 2005.

(51) Int. Cl.
*G06F 17/00* (2006.01)
*G06F 15/16* (2006.01)

(52) U.S. Cl. ...................... 709/206; 707/758

(58) Field of Classification Search ........... 707/2, 3, 707/4, 6, 7, 10, 100, 204, 705, 737, 748, 707/753, 754, 758, 821, 825, 830, 953, 999.1, 707/999.2, 694, 917, 922; 709/200, 201, 709/203, 204, 205, 206, 207, 202, 238; 358/402
See application file for complete search history.

(56) References Cited

U.S. PATENT DOCUMENTS

| 6,154,764 | A | 11/2000 | Nitta et al. |
| 6,167,402 | A * | 12/2000 | Yeager ............................. 707/10 |
| 6,182,117 | B1 | 1/2001 | Christie et al. |
| 7,082,458 | B1 * | 7/2006 | Guadagno et al. ............ 709/204 |
| 7,421,690 | B2 * | 9/2008 | Forstall et al. ................ 718/100 |
| 2003/0037102 | A1 | 2/2003 | Eckert et al. |
| 2004/0199590 | A1 * | 10/2004 | Keohane et al. ............. 709/206 |
| 2004/0210576 | A1 | 10/2004 | Frieden et al. |
| 2005/0004990 | A1 * | 1/2005 | Durazo et al. ................ 709/206 |
| 2005/0057584 | A1 * | 3/2005 | Gruen et al. ................... 345/752 |
| 2006/0075040 | A1 * | 4/2006 | Chmaytelli .................... 709/206 |

OTHER PUBLICATIONS

Samiei et al., EzMail: Using Information Visualization Techniques to Help Manage Email, Information Visualization, 2004, IV 2004. Proceedings. Eighth International Conference on, Jul. 14-16, 2004, pp. 477-482.*
Sudarsky et al., Visualizing Electronic Mail, Information Visualization, 2002. Proceedings. Sixth International Conference on, Jul. 10-12, 2002, pp. 3-9.*
Brewer, R. S., Improving Problem-Oriented Mailing List Archive with MCS, Software Engineering, 2000. Proceedings of the 2000 International Conference on, Jun. 4-11, 2000, pp. 95-104.*
Search Report and Patentability Opinion for PCT/US2006/003332, Jun. 18, 2007, US Patent and Trademark Office, 8 pages.
Notice of Allowance for related Chinese Patent Application No. 200680011402.5, dated May 3, 2010; 4 pages.

* cited by examiner

*Primary Examiner* — Greta Robinson
(74) *Attorney, Agent, or Firm* — North Weber & Baugh LLP (57) ABSTRACT

System, methods and apparatus for analyzing electronic messages and grouping them into threads are described. In addition, the present invention may classify threads based on their relationship to other threads.

17 Claims, 7 Drawing Sheets

| | Message A | Message B | Message C |
|---|---|---|---|
| Date | 2/1/05 | 2/4/05 | 2/5/05 |
| Subject | Project | Project | Meeting |
| Correspondents | A, B & C | A & C | A, B & D |
| Thread ID | N/A | N/A | N/A |

Table 1

Figure 6

THREAD IDENTIFICATION AND CLASSIFICATION

CROSS-REFERENCE TO RELATED APPLICATIONS

This application claims priority benefit of U.S. Provisional Patent Application No. 60/649,395, filed Feb. 1, 2005.

BACKGROUND

A. Technical Field

The present invention relates generally to electronic messaging technology, and more particularly, to analyzing electronic messages and grouping them in threads, which may also be known as discussions or conversations.

B. Background of the Invention

As the personal and business use of electronic messaging, such as email, continues to increase, improved applications for storing, archiving and retrieval of electronic messages are needed. Areas where such technology is important include investigatory fields that need to search through a large number of electronic messages that match a particular search topic. For example, electronic messages may need to be searched and retrieved for compliance with specific corporate obligations or discovery requests that arise during the course of litigation.

One way in which electronic messages may be organized is by grouping electronic messages into threads. A thread is comprised of one or more electronic messages that make up a chain of the correspondence. A thread starts with an initial electronic message and includes any subsequent replies to or forwards from either the initial electronic message or any other message in the thread. One problem with the current applications that group electronic messages into threads is that messages are grouped into threads based purely on the subject of the electronic messages.

Grouping electronic messages based purely on the subject may result in grouping electronic messages that have no relation to one another into a thread. For example, each department of a company may have quarterly meetings to discuss problems or the status of projects for a particular quarter. Each department may send an electronic message, such as an email message to the members of the department with the agenda for the meeting. However, if each department uses the subject "Quarterly Meeting" as the subject of the message, current applications may group all of the meetings from the various groups into a single thread.

Grouping electronic message in this way may not be problematic in a single inbox environment, since only electronic messages sent to the inbox will be included in the thread. However, when viewing electronic messages from multiple inboxes, electronic messages that have no relation to one another and which may include different sets of correspondents may be grouped together in a single thread simply because they share a common subject. These messages may have nothing to do with one another and may increase the difficulty of searching electronic messages rather than making it simpler to locate electronic messages relevant to a particular search query.

SUMMARY OF THE INVENTION

The present invention describes systems, apparatuses and methods for grouping messages received from multiple electronic message accounts into one or more threads. The present invention is capable of grouping messages utilizing different electronic message formats and which may be received out of order into the appropriate threads. The electronic messages and identified threads may be stored in a database or other storage medium which may be searched based on a search term entered by a user. The electronic messages and threads that match the search term may be displayed to the user for additional investigation In one embodiment of the invention, the electronic messages may be parsed to identify one or more header fields that may be used to identify a thread to which the message may belong. Examples of header fields that may be used to identify a thread to which the message belongs include, but are not limited to, the subject, date, and one or more thread identifying headers found within the electronic message. When the thread to which the message belongs is identified, the electronic message may be added to the thread and stored in a database or other storage medium. If no thread is identified for a particular electronic message, the message may be stored in the database and may start a new thread.

In addition to grouping electronic messages into threads, the present invention may also identify related threads and classify one or more threads with respect its related threads. In one embodiment, threads may be classified according to the differences in the correspondents of the related threads. In another embodiment, threads may be classified according to the differences or similarity in the topic or content discussed in the particular threads.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Systems, apparatuses, and methods for analyzing electronic messages and grouping one or more messages into a thread are described. In addition to grouping messages into threads, the present invention may establish relationships between threads and classify threads based on these relationships. In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be performed in a variety of mediums, including software, hardware, or firmware, or a combination thereof. Accordingly, the flow charts described below are illustrative of specific embodiments of the invention and are meant to avoid obscuring the invention.

Reference in the specification to "one embodiment," "a preferred embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

In one embodiment, a software application analyzes electronic messages received from one or more user accounts and groups the messages into threads. For example, the application may analyze and group the electronic messages from all of the users of a company or department within a company into threads for further analysis. There are a number of ways in which the application may receive the electronic messages from multiple user accounts. In one embodiment, the application may receive the electronic message from an electronic message server, such as an email server in the case of email messages. Electronic message servers may contain a copy of all the electronic messages sent or received by a company or a specific department's users. In another embodiment, the electronic message server may be set up to forward a copy of each incoming or outgoing electronic message to the application for analysis. In addition to those described above, one skilled in the art will recognize that there are other ways the application may gain access to electronic messages from multiple user accounts. Other methods for accessing electronic messages from multiple user accounts, though not specifically mentioned, are considered within the scope of the present invention.

In one embodiment, the application of the present invention parses each electronic message to identify one or more header fields. The header fields of the electronic message may be compared with the corresponding header fields of one or more existing threads stored in a database or other storage medium to determine a thread to which the message belongs. The application may store the electronic message in the database and add the electronic message to the appropriate thread. The present invention may also analyze the messages that make up the threads to determine the relationships between the various threads and may classify threads based on these relationships.

Figure 1:
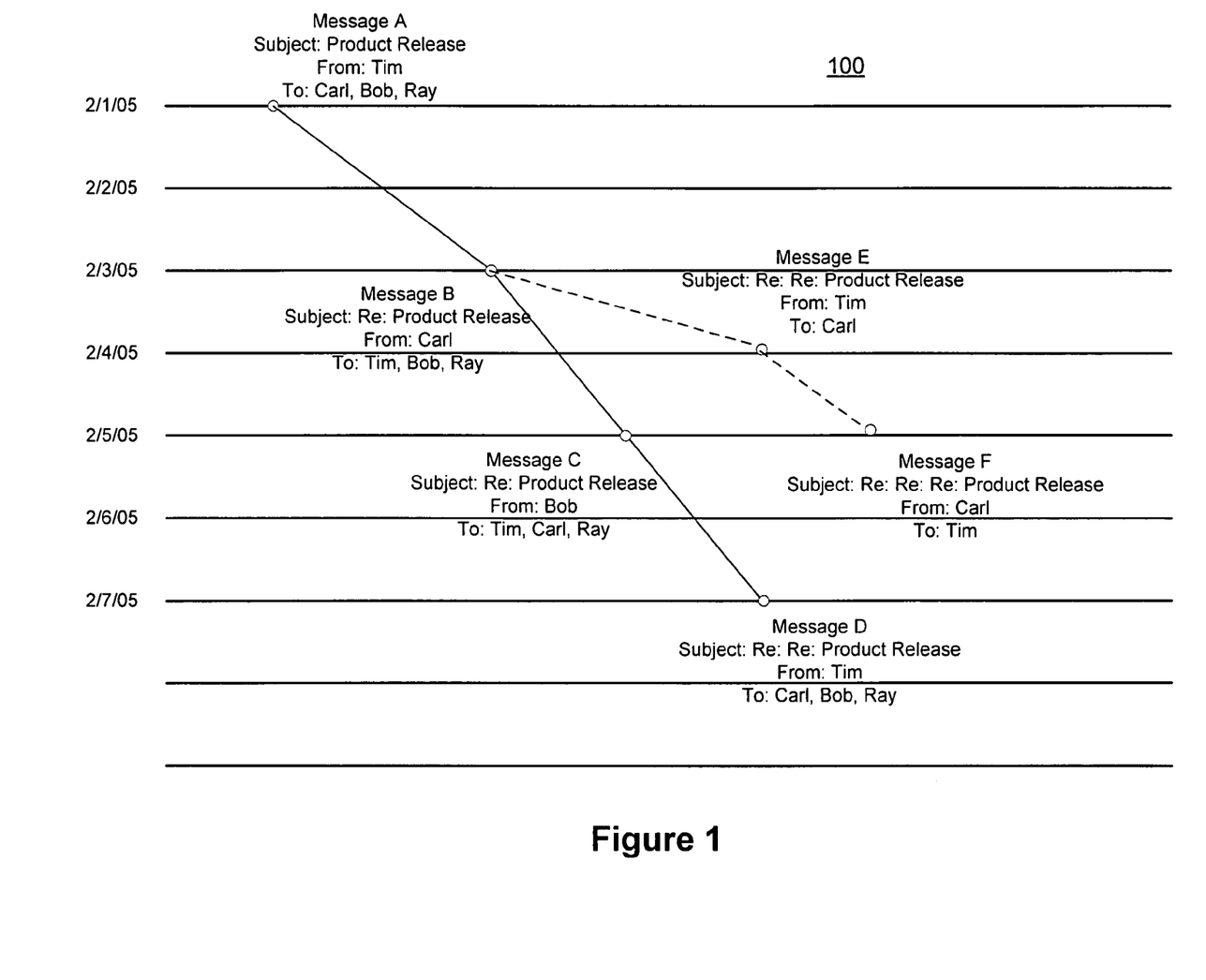
FIG. 1 illustrates a thread of electronic messages along with a related thread.

FIG. 1 illustrates an example of a thread group 100 according to one embodiment of the present invention. A thread group is a collection of messages with an initial message that is not a reply or forward of any previous message, such that all other messages in the thread group are a reply or forward to the initial message or an earlier message in the thread group. In FIG. 1, Messages A, B, C, D, E and F make up a thread group. Message A is the initial message since it is the earliest message of the thread. The other messages are replies to either Message A or another message in the chain of messages originating from Message A.

There are a number of ways to determine if an electronic message is a reply or forward of another message. For example, a message may include a reply or forward header that identifies the message to which the current message is a reply or forward. As another example, a message may be classified as a reply or forward of a second message if it shares a normalized, or modified, subject and falls within an acceptable date range of the second message, and shares one or more correspondents with any other message in the thread group. A normalized subject for a message may be found by removing any subject prefixes, such as Re, RE, FW, FWD, Fwd, etc. from the subject field of a message. The normalized subject may be compared with the normalized subjects of other messages to find one or more messages with which the message may form part of a thread group.

The date of the message may be compared with the date range of the messages that share the same normalized subject to determine whether the messages make up a thread group. For example, one may want to limit messages with the same subject that are grouped into a thread group to messages that occur within an interval amount of time before or after the messages that share the same subject, as discussed further herein.

As another example, determining whether a message is a reply or forward of a previous message may be heuristically inferred from the subject or body of the message. The presence of a subject prefix, such as Re, RE, FW, FWD, Fwd, etc. may indicate that a message is a reply to a previous message. As another example, the body of the message may include text or another identifier indicating that a message is a reply or forward of a previous message. For example, if the body of the text includes a statement such as "Begin forwarded message" or includes indented text from the previous messages, this may indicate that the message is a reply or forward of a previous message.

In one embodiment of the invention, the electronic messages that make up a thread group may be grouped into one or more threads. There are a number of criteria that may be used to group messages into threads. In one embodiment, the messages may be grouped into threads based on the correspondents of the individual messages. Messages within a thread group that have the same correspondents and are a reply or forward from a common message or are a reply or forward from a message which is part of a chain originating from the common message may be grouped into a thread.

In one embodiment of the invention, the correspondents of a message may be defined as the sender and all recipients named either explicitly or by virtue of their membership in a mailing list in the recipient fields of the electronic message, or by virtue of their having received the message even if they are not a listed recipient (bcc). A mailing list is a virtual address that may be input into an electronic message that represents a plurality of recipients. The members of a mailing list may be determined in a number of ways. In one embodiment, the application may request the individuals represented by the mailing list from an electronic message (e-message) server, such as an email server in the case of electronic mail (email) messages. In another embodiment, membership in a mailing list may be heuristically inferred. For example, if an individual replies to a message in which they were not explicitly named as a correspondent, and which contains a mailing list, then the individual may be assumed to be a member of one of the mailing lists.

Since the messages that make up a thread group may have different sets of correspondents, each thread group may be comprised of multiple threads. In one embodiment of the invention, threads may be further classified such that a thread group comprises a main thread and one or more related threads. In one embodiment, the main thread is a thread comprised of the initial message of the thread group and the chain of reply messages from the initial message that have the same correspondents as the initial message. For example, in FIG. 1, Messages A, B, C and D make up the main thread of the thread group 100. In this example, electronic messages A, B, C and D have the same subject, Product Release, and the same correspondents, Tim, Carl, Bob and Ray. Message A is the initial message of the main thread, while messages B and C are both replies to message A and message D is a response to message C.

The rest of the threads within the thread group may be classified as related threads. Related threads are comprised of an initial message which is a reply or forward from a message that is part of another thread within the thread group but includes a different set of correspondents, or other criteria that distinguishes the electronic message from the parent message from which it is a reply or forward. The related thread is said to branch from the other thread. Referring again to FIG. 1, Messages E and F are messages within the thread group that may be grouped into a second thread. As illustrated, Messages E is a reply to Message B. However, Message E is a response from Tim that was only sent to Carl. Since Message E includes fewer correspondents than Message B, Message E is an initial message of a related thread that branches from the main thread at Message B. In this example, the related thread includes Message E and Message F, which is a reply to Message E.

In one embodiment, it may be assumed that the topic or contents of message E, though possibly related to the topic or contents of the main thread, may only be relevant to Tim and Carl. By distinguishing between threads in this manner and classifying threads that are sent to different correspondents than the thread they branch from as related threads, the electronic messages that make up the threads may be presented to a user in a way that helps the user to determine which messages may be relevant to a particular search query, or to a particular topic of discussion. For example, related threads may be illustrated differently than the main thread. In FIG. 1, the related thread messages are connected by dashed lines rather than solid lines. This provides a visual indication to the user that messages E and F make up a related thread.

Related threads may be further classified with respect to the thread from which the related thread branches based on the difference in correspondents between the two threads. For example, a thread whose initial message is a reply from another message within the thread group but is comprised of fewer than all of the correspondents of the message from which it is a reply may be classified as a reduced thread. In FIG. 1, the related thread comprised of Messages E and F may be classified as a reduced thread since the correspondents of Message E are a subset of the correspondents of the message from which the related thread branches, Message B.

As another example, a related thread whose initial message is a reply from another message within the thread group but is comprised of the same correspondents as the message from which it is a response plus additional correspondents may be classified as an expanded thread. However, in another embodiment, a reply message that includes all of the correspondents of the message from which it is a reply but also includes one or more additional correspondents may be grouped into the thread rather than classified as an expanded thread. In yet another example, a thread whose initial message is a reply whose correspondents are neither strictly reduced nor expanded may be classified as an overlapping thread. For example, a thread whose initial message includes a subset of the correspondents of its parent message, i.e. the message from which it is a reply, plus some new correspondents not found in the parent message may be classified as an overlapping thread.

In yet another example, a thread whose initial message is a forward of another message within the thread group, regardless of correspondents, may be classified as a forwarded thread. As another example, a forwarded or overlapping thread that contains no correspondents in common with the main thread may be classified as a spawned thread.

A thread whose subject has been modified from that of the main thread or from the thread from which it branches in a way other than changes in simple prefix, case, white space, and punctuation may be considered a modified thread. As another example, a thread that has exactly one correspondent in common with the message from which it branches may be classified as an exclusive thread.

In yet another example, a thread whose topic has changed from the thread from which it branches may be classified as an altered thread. In one embodiment, the contents or topic discussed in the electronic message may be compared with the contents or topic discussed in one or more messages within its thread or the thread from which it branches. If the topic or contents of the electronic message are different from the contents or topic of the other messages within the thread or from the messages of the thread from which the message branches, the message may be classified as an altered thread. Again, this may be useful to an investigator when reviewing a message thread.

In one embodiment, keywords and/or phrases may be extracted from the messages that make up the thread. These keywords and/or phrases may be compared to keywords and/or phrases parsed from the electronic message to determine the overlap in the bodies of the messages. A high overlap indicates content similarity between the messages. A low overlap indicates that the electronic message may be classified as an altered thread since the contents differ from the contents of the rest of the thread. One skilled in the art will recognize that there are many other content similarity tests that may be applied to the messages that make up a thread to determine the similarity of the content of a message with the content of the remainder of the messages within a thread.

One skilled in the art will recognize that these are only some of the possible ways threads may be classified. Other classifications are possible and are considered within the scope of the present invention.

Figure 2:
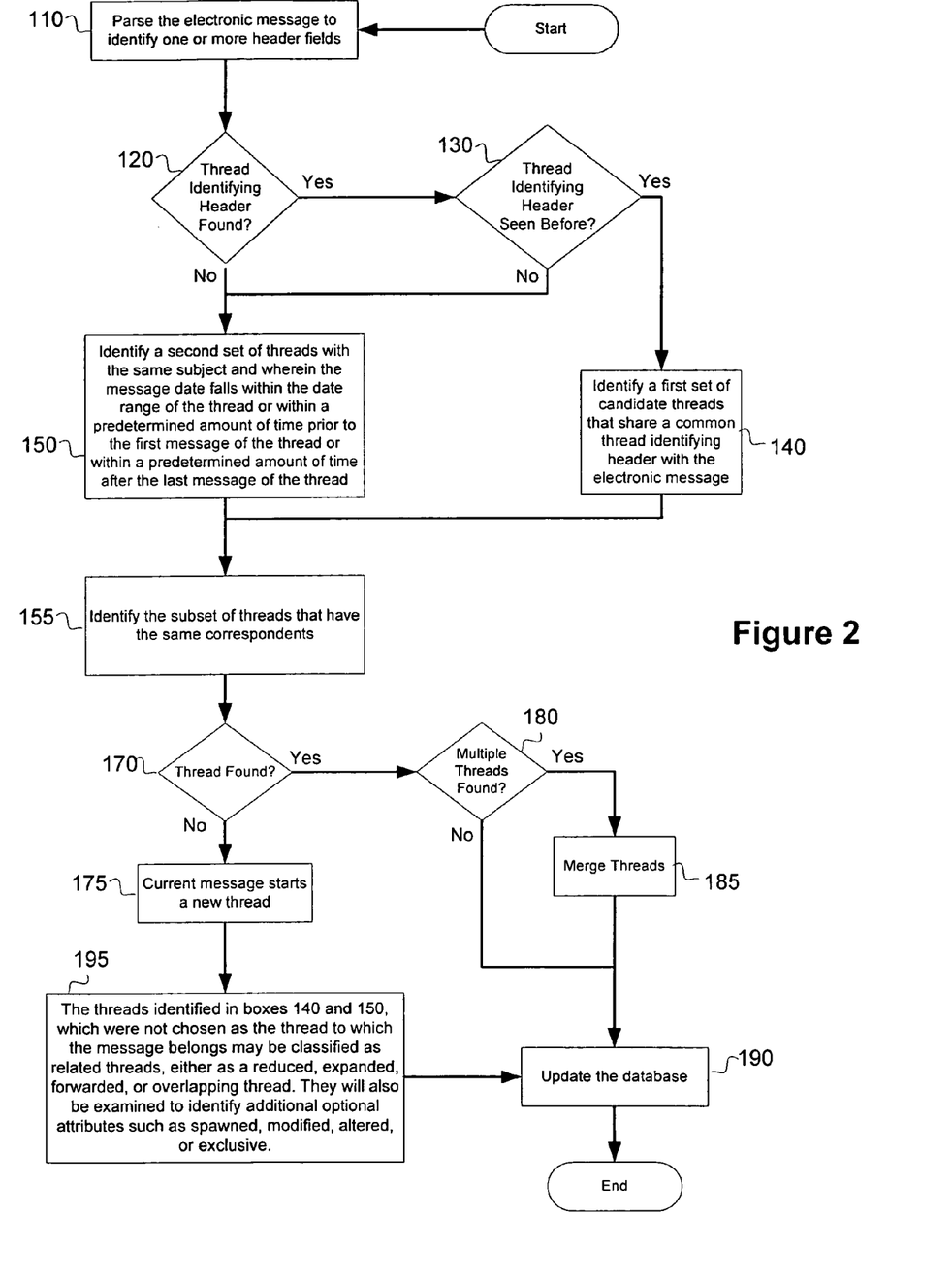
FIG. 2 illustrates a flow chart of a method for grouping electronic messages into a thread according to one embodiment of the invention.

FIG. 2 illustrates a flow chart for grouping an electronic message into a thread according to one embodiment of the invention. An electronic message is parsed 110 to identify one or more header fields of the electronic message. Examples of header fields may include, but are not limited to, the subject of the message, the date the message was sent, a thread identifying header, a references field, an in-reply-to field, and one or more recipient fields.

The recipient fields, including the To:, From:, Cc:, Bcc:, and Apparently-To: fields, typically contain the electronic addresses of the correspondents of the electronic message. The recipient fields may also include one or more mailing lists. For example, a company may have a mailing list called Sales Department which maps to a list of electronic addresses for the individuals in the sales department of the company. When sending an electronic message to the individuals in the sales department, the user may enter "Sales Department" into the recipient field instead of inserting each individual's electronic message address. When the message is sent, the electronic message server recognizes the mailing list and expands the mailing list by forwarding a copy of the message to the addresses of each of the individuals represented by the mailing list.

In one embodiment of the invention, when parsing a recipient field of an electronic message that includes a mailing list, the mailing list may be expanded by looking up the electronic message addresses for each of the individuals represented by the mailing list. For example, the application may request the electronic message addresses represented by the mailing list from the electronic message server or a directory service. The application may associate each of the electronic message addresses represented by the mailing list at the time the message was sent into the appropriate recipient header field and stored in the database. The mailing list may also be stored in the database with the associated message.

The present invention utilizes the header fields parsed from the message to determine a thread to which the message belongs. One skilled in the art will recognize that the number and type of header fields found within an electronic message may vary depending on the message format used to create the electronic message. For example, an electronic message utilizing the RFC 2822 Internet message format may include specific header fields that are not found in Microsoft's proprietary electronic message format, and vice versa. As described below, the present invention is capable of analyzing and grouping messages of different formats into the appropriate threads.

One example of a header field that may be included in an electronic message is a thread identifying header. As will be discussed herein, a thread identifying header comprises information that may be used to identify a thread to which the message belongs or one or more messages to which the current electronic message is a response. For example, a thread identifying header may comprise a unique number or other identifier that is included in a header field of each message of a thread or thread group. As another example, the thread identifying header may list the parent message or all or a portion of the other messages that make up the same thread and/or thread group. These thread identifying headers provide a shortcut to identifying the appropriate thread for a given message.

If a thread identifying header is found 120, the thread identifying header may be compared to a corresponding thread identifying header field of each of the existing threads. If the thread identifying header has been seen before 130 (i.e. it matches a thread identifying header associated with one or more of the existing threads), the one or more threads that may be identified with the thread identifying header may be added to a first set of candidate threads 140. One or more candidate threads may exist for an electronic message if there are one or more related threads that share a common thread identifier.

For example, Microsoft uses a proprietary electronic message format that includes a thread identification field referred to as a Thread Index. The Thread Index identifies the current electronic message and each message within the thread that preceded the current message. Electronic messages originating from a Microsoft application, such as Microsoft Exchange or Microsoft Outlook, may include a Thread Index. The string of messages that make up a thread may be parsed from the Thread Index and compared to each of the existing threads to identify one or more candidate threads to which the message may belong. Existing threads that include the messages identified in the Thread Index of the electronic message are potential candidate threads which may be added to a first set of candidate threads.

As another example, messages formatted using the RFC 2822 format may include one or more header fields which are thread identifying headers that identify the parent message(s) to which the electronic message is a reply. Examples of thread identifying headers in RFC 2822 formatted messages include, but are not limited to, the "in-reply-to" and "References" header fields. Each electronic message formatted in the RFC 2822 format includes a unique message ID. The in-reply-to header includes the message ID of its parent message, the message to which it is a reply. Similarly, the references header field may include the message IDs of the other electronic messages that make up the discussion thread. In other words, the references field may include the messages IDs for one or more of the electronic messages that precede the current electronic message in the thread.

By comparing the message IDs found within the in-reply-to and the references fields with the message ID fields of the messages that make up the existing threads, one or more candidate threads may be identified 140 to which the electronic message may belong. These candidate threads may be added to the first set of candidate threads.

The first set of candidate threads may be reduced by identifying 155 a subset of threads from the first set that have the same correspondents as the electronic message. As discussed above, a thread may be defined to include those messages that are a reply or forward of another message and include the same correspondents. A reply or forward with a different set of correspondents may be classified as a related thread. Thus, the threads that have the same correspondents as the electronic message are the threads to which the message may belong.

It should be noted that not all electronic messages will include a thread identifying header field. Many of these thread identifying header fields are optional header fields which many electronic message programs do not include in each electronic message. However, as described herein, the present invention may use other header fields parsed from the electronic message to identify potential candidate threads to which the message may belong. By being able to handle electronic messages with thread identifier headers and those that do not, and by being able to handle electronic messages with varying or mixed formats of thread identifying headers, the present invention is capable of grouping electronic messages of differing formats into the appropriate threads.

If no threads that share a common thread identifying header with the message are found 130, or if no thread identifying header is found 120 within the electronic message, additional header fields of the electronic message may be used to identify one or more of the existing threads to which a message may belong. In one embodiment, the subject, the date and the correspondents of the electronic message may be compared to the subject, date range, and correspondents of each of the existing threads to identify one or more potential candidate threads.

In one embodiment, a second set of candidate threads may be identified 150 that have the same subject as the electronic message and for which the date of the electronic message occurs around the same time as one or more of the electronic messages that make up the thread. In one embodiment, the subject of the electronic message may be normalized by removing any indicators that the message is a response to a previous message or has been forwarded from a previous message. For example, many email programs add "Re:" and "Fw:" to the subject of a message that has been forwarded or responded to, respectively. The normalized subject may be compared with a subject that is common to the messages within an existing thread stored in the database.

In one embodiment, the date range of the thread defines the period of time between the earliest message in the thread and the latest occurring message in a thread. In one embodiment, if the date of the electronic message falls within the date range of the thread or within either an amount of time prior to the earliest message in the thread, or pre-interval, or within an amount of time after the latest occurring message in the thread, or post-interval, the thread may be added to the second set of candidate threads if it shares the same subject as the electronic message, The pre-interval may be the same as the amount of time as the post-interval or a different amount of time. One skilled in the art will recognize that the pre-interval and the post-interval may be varied depending on the application. In one embodiment, the pre-interval and post-interval may be fixed and in another embodiment, the pre-interval and post-interval may adjust dynamically with the size of the thread or other characteristics of the thread. For example, the pre-interval and/or post-interval may be smaller for a thread comprising a small number of messages than for a large thread that has a lot of messages that are spread out over a long period of time.

Figure 3A:
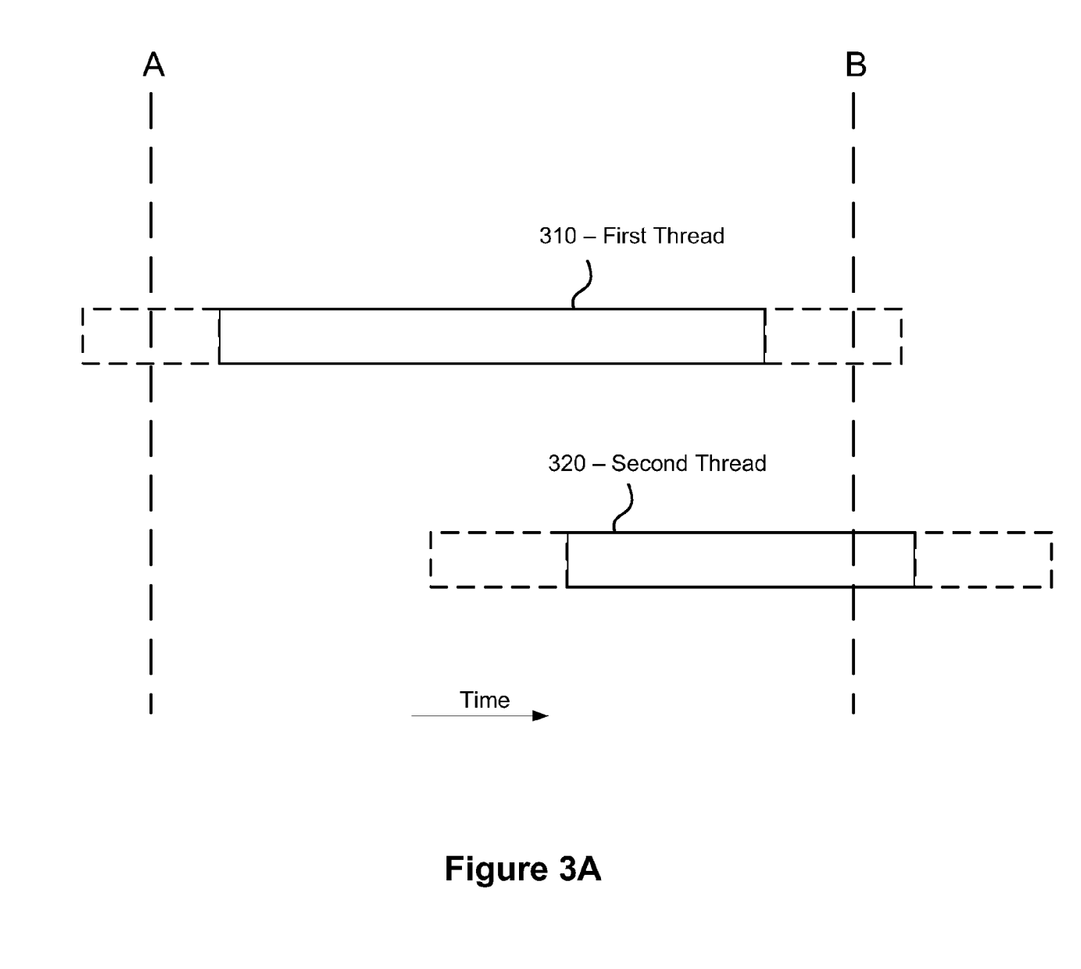
FIG. 3A illustrates a visual representation of the date range of two threads, 310 and 320.

FIG. 3A is a representation of a timeline for two threads, 310 and 320. The solid box represents the date range of the thread. The date of the first message in the thread is represented by the left end of the solid box and the date of the last message in the thread is represented by the right end of the solid box. The dashed extensions to the solid box represent the pre-interval and post-interval, respectively. The pre-interval and post-interval account for messages that are part of the thread, but which occur prior to or later than the current messages that make up the thread, while at the same time limiting the amount of time outside of the current thread date range during which a message with the same subject may be considered part of the thread.

For purposes of this example, assume that the electronic message currently being analyzed has a date represented by line A in FIG. 3A. Also assume for purposes of this example, that the subject of the electronic message is the same as the subject for both threads 310 and 320. Since the subject matches thread 310 and the message falls within the pre-interval prior to the first message of thread 310, thread 310 may be added to the second set of candidate threads. However, since the message does not fall within the pre-interval prior to the first message of thread 320, this thread is not a candidate thread for the electronic message even though it shares the same subject as the electronic message.

The second set of candidate threads may be reduced by identifying 155 a subset of threads from the first set that have the same correspondents as the electronic message. As discussed above, a thread may be defined to include those messages that are a reply or forward of another message and include the same correspondents. A reply or forward with a different set of correspondents may be classified as a related thread. Thus, the threads that have the same correspondents as the electronic message are threads to which the message may belong.

If a thread is found 170 within the subset of the first or second sets of threads in box 155, the identified threads are the candidate threads to which the electronic message may belong. In most cases, only a single thread, the thread to which the electronic message belongs, will be found. When a single thread is identified, the database may be updated 190 to add the electronic message to the database and to include the electronic message as part of the identified thread.

In some cases, more than one thread may be found 180 in box 155. This may occur when the electronic message is a bridge between two existing threads that brings the two threads together into a single thread. In this case, the two threads may be merged together 185 into a single thread.

Figure 3B:
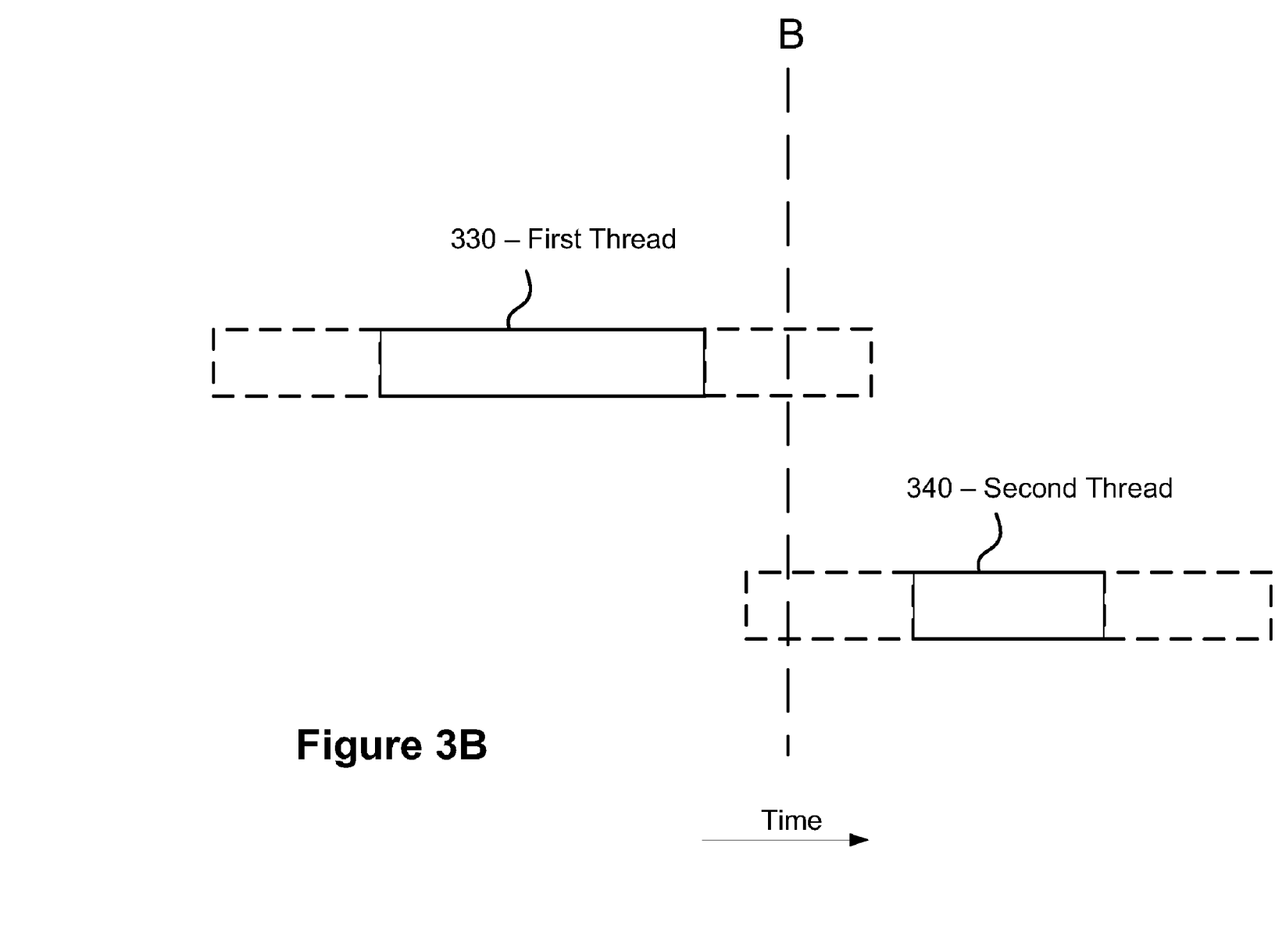
FIG. 3B illustrates a visual representation of the date range of two threads, 330 and 340.

For example, FIG. 3B illustrates two threads 330 and 340, with the interval amount of time prior to the first message in each thread and after the last message in the thread identified by the dashed extensions. Assume, for purposes of this example that threads 330 and 340 share the same subject and the same correspondents with an electronic message that has a date represented by dashed line B. In this case, both threads will be identified in boxes 150 and 155. The reason is that the two threads are likely part of the same thread. However, they have been classified as different threads up to this point since the first message of thread 340 and the last message of 330 did not occur within the post-interval amount of time after the last message of 330 or within the pre-interval amount of time prior to the first message of thread 340, respectively. Thus, they could not be previously grouped together in a single thread. With the introduction of the electronic message occurring at time B, which falls within the pre-interval amount of time prior to the start of thread 340 and within the post-interval amount of time after thread 330, the two threads may be merged together into a single thread and the database may be updated to reflect the merged thread.

Returning to decision box 170, if no threads are found 170 within the subset of the first or second sets of candidate threads, then the electronic message is part of a new thread 175. In this case, the threads identified in boxes 140 and 150 may be classified 195 as related threads. These threads share a thread identifying header or share the same subject and date range with the electronic message. Further analysis may be performed to further classify the related threads. In one embodiment, the correspondents of the electronic message may be compared with the correspondents of each of the related threads to determine if the new thread may be classified as a reduced, expanded, exclusive or overlapping thread with respect to each of the related threads.

Alternatively, the type of message or other attributes of the electronic message may be compared with each of the related threads to determine its relation with respect to the related threads. For example, if the electronic message is a forward of a previous message of one of the related threads, the new thread may be classified as a forwarded thread. A forwarded thread may be further classified as a spawned thread if it contains no correspondents in common with the message from which it was forwarded. As another example, if the electronic message has a subject that has been modified from the related thread's subject in a way other than changes in simple prefixes, letter case, white space, and/or punctuation; it may be classified as a modified thread.

As another example, if the topic of the electronic message is different from the topic of the thread from which it branches, the new thread may be classified as an altered thread. As discussed above, the contents or topic of the electronic message may be compared with the contents or topic discussed in one or more messages within a related thread. If the topic or contents of the electronic message is different from the contents or topic of the messages that make up the related thread, the new thread may be classified as an altered thread with respect to the related thread.

It should be noted that the present invention is not limited to the thread definitions described above. One skilled in the art will recognize that other thread definitions and classifications are possible and are considered within the scope of the present invention. It should also be noted that the present invention can group the messages received out of order into the appropriate threads.

The database may be updated 190 with the new thread and may also be updated to include the classifications of the various threads and/or the relationships between the new thread and each of the related threads found in box 195.

Figure 4:
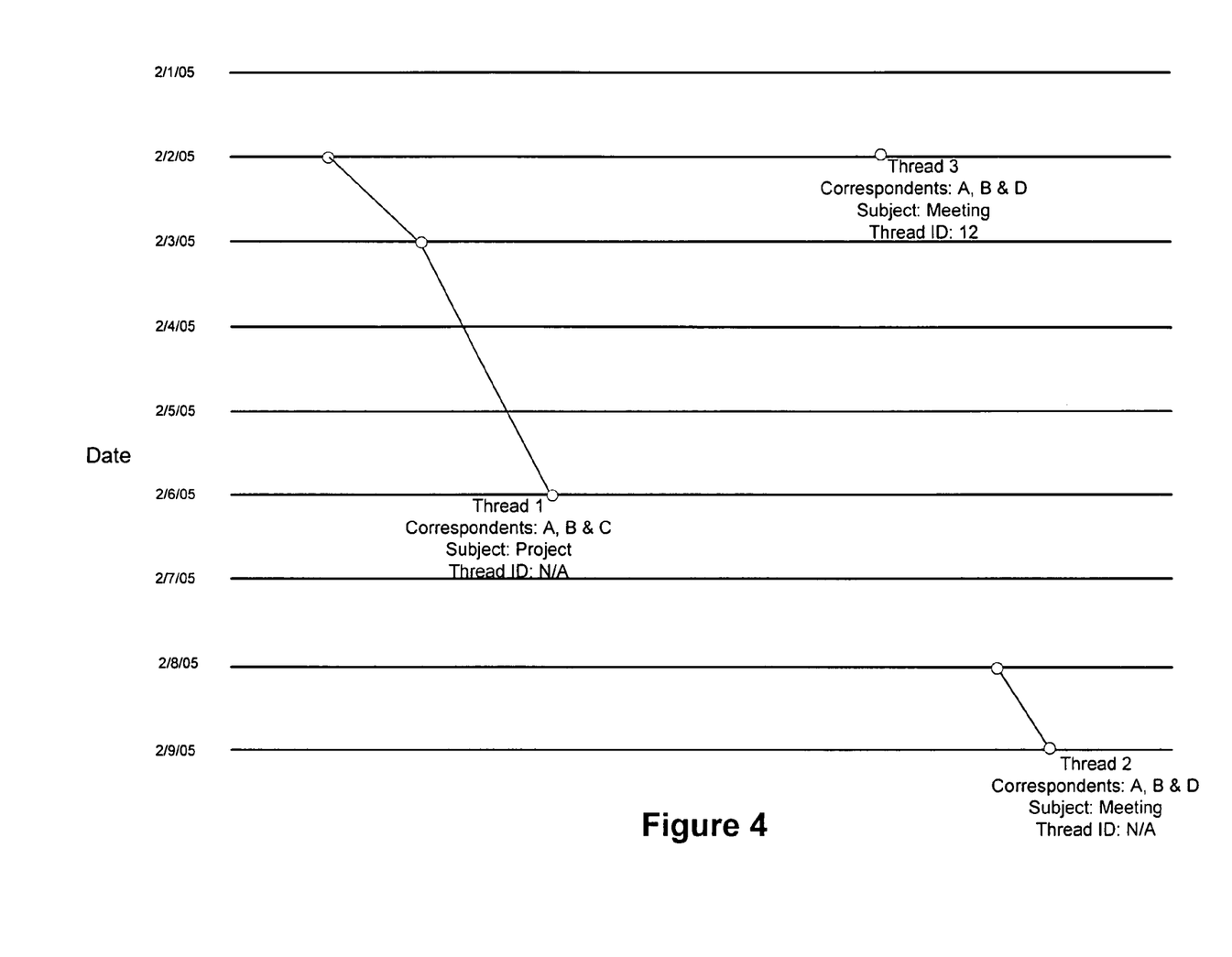
FIG. 4 is a diagram illustrating three sample threads.

FIG. 4 illustrates three threads, Thread 1, Thread 2 and Thread 3 in graphical form. As illustrated, Thread 1 consists of three messages and has a set of correspondents comprising A, B & C and a subject of Project. Thread 1 does not have a Thread ID or any other thread identifying headers. Thread 2 consists of two messages and has a set of correspondents comprising A, B & D and a subject of Meeting. Thread 3 consists of a single message and also has a set of correspondents comprising A, B & D and has a subject of Meeting. Thread 3 also has a thread identifying header that indicates it belongs to a thread with a thread ID of 12.

Figure 5:
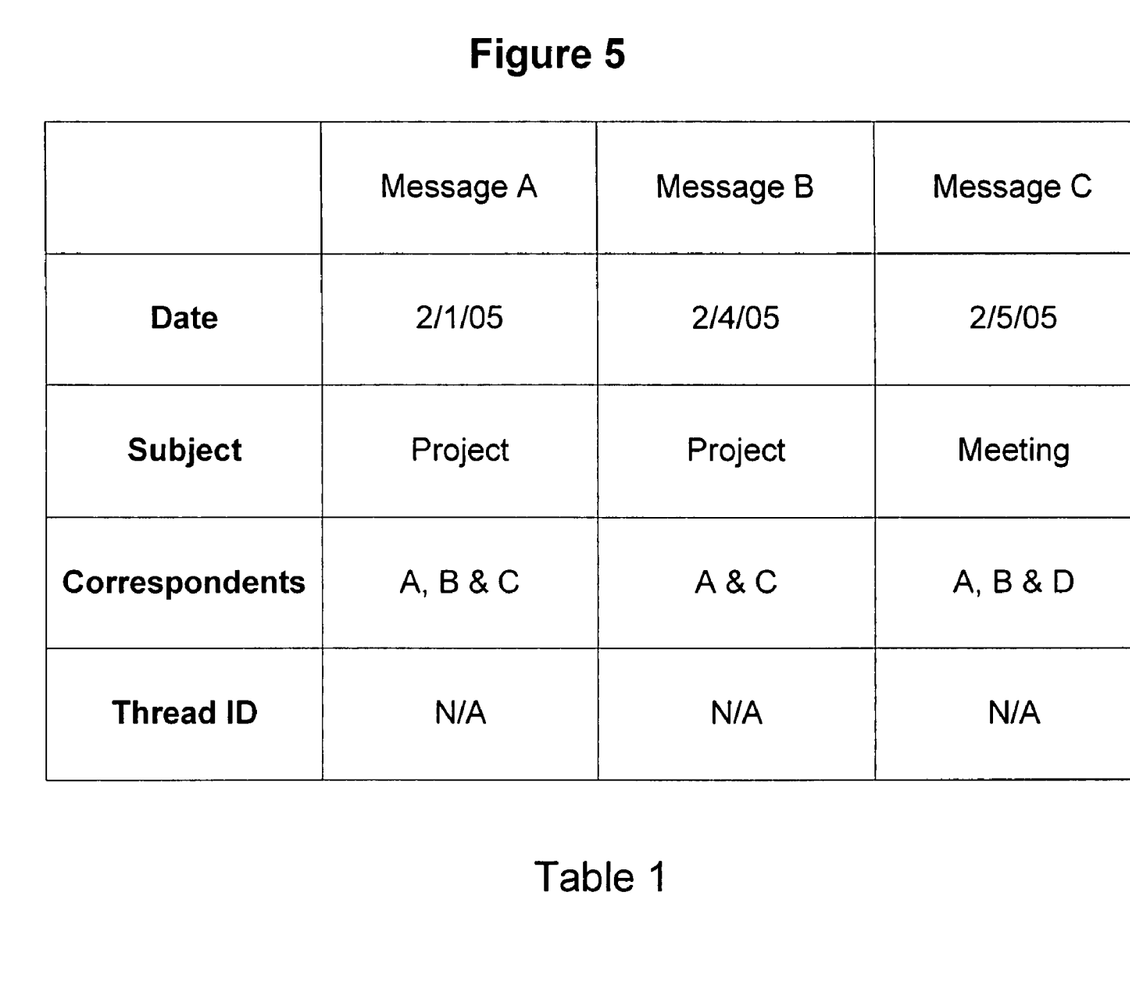
FIG. 5 is a table of information for three electronic messages.
Figure 6:
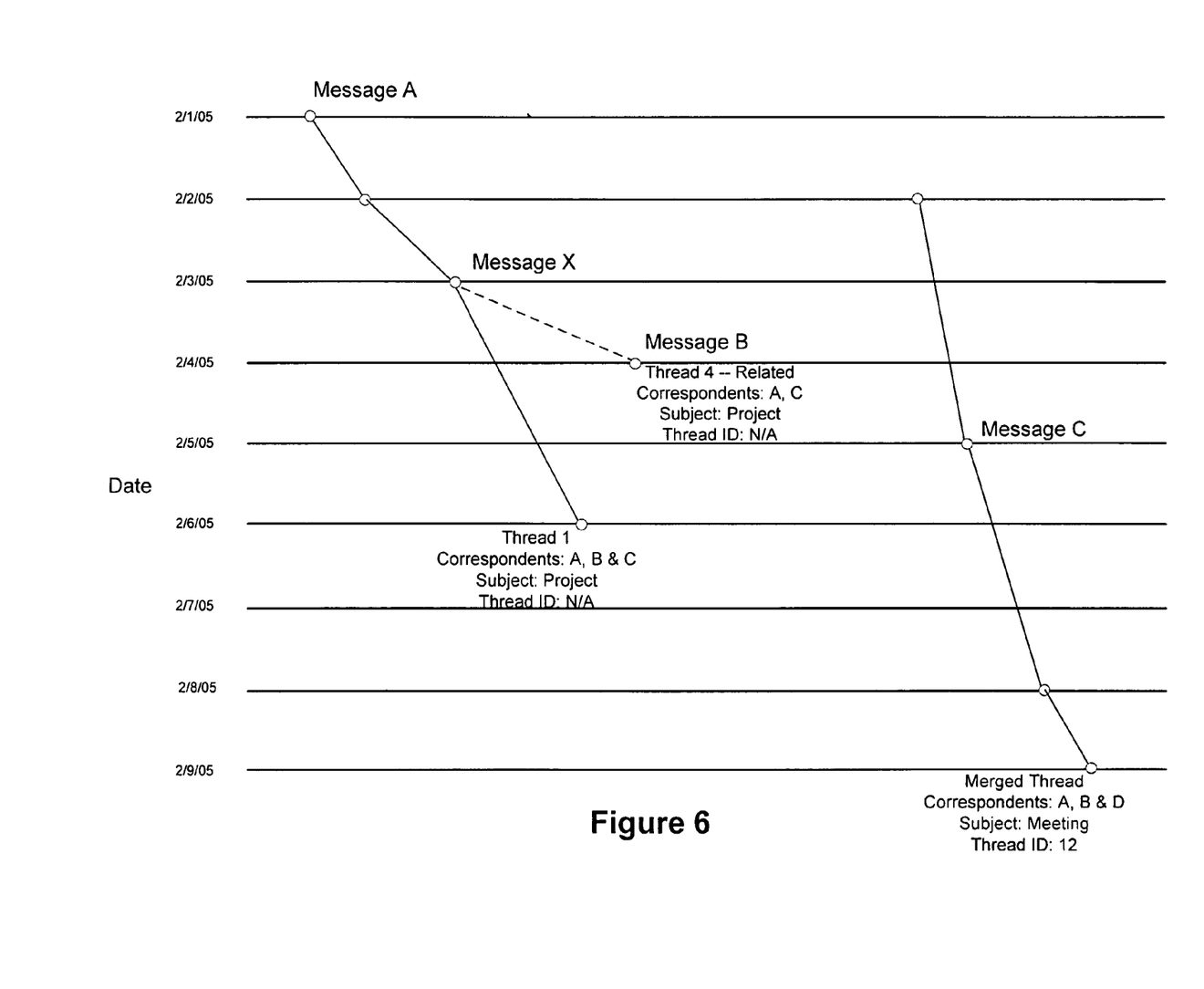
FIG. 6 is a diagram illustrating the sample threads of FIG. 4 with the electronic messages of FIG. 5 added to the threads.

FIG. 5 illustrates a table of three messages, A, B and C with the header fields date, subject, correspondents and thread ID that have been parsed from each message. Using the threads illustrated in FIG. 4 as the existing threads stored in the database, the messages listed in Table 1 may be analyzed, grouped and classified as described in the flow chart illustrated in FIG. 2. FIG. 6 illustrates the resulting threads after the messages from Table 1 have been grouped into the appropriate threads.

As illustrated in Table 1, message A does not have a thread identifying header. As a result, the subject and the date of message A may be analyzed to identify 150 one or more candidate threads to which the message may belong. Assume, for purposes of this example, that the pre-interval and post-interval amount of time is defined as 4 days. Since the date of message A, Feb. 1, 2005, falls within 4 days of the first message in Threads 1 and 3, they may be potential candidate threads. However, when the subject of message A is compared with the subjects of Threads 1 and 3, one finds that the subject of message A does not match the subject of Thread 3. Thus, Thread 1 may be added to the second set of candidate threads. It should be noted that no candidate threads were found in Box 140 since no thread identifying header was found in message A.

Proceeding to box 155, the correspondents of message A are compared with the correspondents of the threads in the second set to identify the subset of threads that have the same correspondents as the message. In this case, Thread 1 is the only thread in the second set of threads that has the same correspondents as message A. Since only one candidate thread was found 180, the database may be updated 190 to include message A and to add message A to Thread 1. FIG. 6 illustrates Thread 1 with the addition of message A.

Returning to Table 1, one finds that message B does not have a thread identifying header. Thus, the subject and the date of message B are analyzed to identify 150 one or more candidate threads to which the message may belong. Since the date of message B falls within the date range of Thread 1 and within 4 days after the last message of Thread 2 and within 4 days of the first message of thread 3, all three threads may be potential candidate threads. However, when the subject of message B is compared with the subject of the three threads, one finds that Thread 1 is the only thread that shares the same subject with message B. Thus, Thread 1 may be added to the second set of candidate threads.

Proceeding to box 155, the correspondents of message B are compared with the correspondents of the threads in the second set to identify the subset of threads that have the same correspondents as message B. In this case, Thread 1 is the only thread in the second set of threads. However, Thread 1 comprises correspondents A, B & C, while message B only comprises correspondents A & C.

Since there are no threads in the second set that have the same correspondents as message B, message B starts a new thread 175. Proceeding to box 195, Thread 1 was identified in box 150. Thus, the new thread started by message B is a related thread with respect to Thread 1. Again, comparing the correspondents of message B with the correspondents of Thread 1, one finds that message B comprises fewer correspondents than Thread 1. Thus, the new thread started by message B may be classified as a reduced thread with respect to Thread 1. The database may be updated 190 to add message B and the new thread started by message B. In addition, the database may be updated to include the classification of the new thread as a reduced thread with respect to Thread 1.

FIG. 6 illustrates Thread 1 and the new thread started by message B, labeled Thread 4. As illustrated, message B branches from Thread 1 at Message X. Note that message B is connected to message X of Thread 1 by a dashed line to signify that message B is a related thread, in this case a reduced thread. Note that a different visualization may be used for each different classification of related threads to distinguish between the different types of related threads.

Message C also does not have a thread identifying header. Thus, the subject and the date of message C may be analyzed to identify 150 one or more candidate threads to which the message may belong. Since the date of message C falls within the date range of Thread 1 and within 4 days after the last message of Thread 2 and within 4 days of the first message of thread 3, all three threads may be potential candidate threads. However, when the subject of message C is compared with the subject of the three threads, one finds that only Threads 2 and 3 share the same subject with message C. Thus, Threads 2 and 3 may be added to the second set of candidate threads.

Proceeding to box 155, the correspondents of message C are compared with the correspondents of the threads in the second set to identify the subset of threads that have the same correspondents as message B. In this case, both Thread 2 and Thread 3 share the same correspondents with message C. Thus, Threads 2 and 3 are identified as the subset.

Since multiple threads were found 180 in box 155, a special condition has been encountered where message C provides a bridge between two threads that were previously believed to be independent threads. Threads 2 and 3 may be merged 185 with message C added to the merged thread. The database may be updated 190 to include message C and to update the threads such that Thread 2 and Thread 3 and message C are merged into a single thread. FIG. 6 illustrates the merged thread.

It is important to note that Thread 3 had a thread ID of 12 while, Thread 2 did not have a thread ID, even though the two threads are part of the same thread. The reason for this arises from the fact that the messages being analyzed and classified together may have originated from multiple user accounts that may be utilizing different electronic mail formats. For example, the message that made up Thread 3 may have originated from a user A, who utilized an electronic message application that applies a thread identifying header to each message. However, the users B and D may have used an electronic message application that did not add thread identifying headers to messages. It is important to note that the present invention grouped these messages into the same thread despite the differences in the header fields that were parsed from the messages.

In an alternative embodiment of the invention, further analysis may be performed once a message has been grouped into a thread to determine if the topic discussed in a message matches the topic discussed in the rest of the messages that make up the thread. In one embodiment, the contents or topic discussed in the electronic message may be compared with the contents or topic discussed in one or more messages within its thread. If the topic or contents of the electronic message are different from the contents or topic of the one or more messages that make up the rest of the thread, the electronic message may be classified as an altered thread. Again, this may be useful to an investigator when reviewing a message thread.

In one embodiment, keywords and/or phrases may be extracted from the messages that make up the thread. These keywords, phrases and/or terms that are similar to the keywords and phrases may be compared to keywords and/or phrases parsed from the electronic message to determine the overlap in the keywords used in the bodies of the messages. A high overlap indicates content similarity between the messages. A low overlap indicates that the electronic message may be classified as an altered thread since the contents differ from the contents of the rest of the thread. One skilled in the art will recognize that there are many other content similarity tests that may be applied to the messages that make up a thread to determine the similarity of the content of a message with the content of the remainder of the messages within a thread.

The systems, methods and apparatuses described above may process the electronic messages received from one or more user accounts in a number of ways. For example, messages may be analyzed sequentially and grouped into threads as received in real time. As another example, messages may be analyzed in a batch, with the various threads determined using the messages of the batch and then grouping the threads from various batches at a later time. Alternately, the messages may be analyzed sequentially as received from an electronic message server or other storage medium. In such instances, the messages may be analyzed and grouped out of order. As a result, the threads and the various classifications associated with various threads may change over time. Thus, for example, it may be necessary to merge threads that were previously thought to be distinct due to date range considerations or other factors. One skilled in the art will recognize that the there are many ways to analyze and group messages into threads using the present invention as described above. All such processes are considered within the scope of the present invention.

While the present invention has been described with reference to certain embodiments, those skilled in the art will recognize that various modifications may be provided. For example, while the present invention has been described generically with respect to electronic messages, one skilled in the art will recognize that the present invention is applicable to email messages, Instant Messages (IM), Short Message Service (SMS) messages, voice messages, video messages and others. In addition, though the embodiments of the invention have been described with respect to an application for organizing electronic messages from a plurality of mail boxes, many of the features discussed above may also be utilized in a single mail box environment. Variations upon modifications to the embodiments are provided for by the present invention, which is limited only by the following claims.

What is claimed is:

1. A method for grouping an electronic message into one of a plurality of threads, comprising:
   receiving a plurality of search criteria comprising a subject, a date range and set of correspondents;
   performing a search query on a plurality of electronic messages within a storage device, the search query being based on the plurality of search criteria;
   identifying the electronic message stored within the storage device based on the subject, the date range and the set of correspondents;
   retrieving the electronic message from the storage device, the storage device being coupled via a network to a computer having a computer display;
   parsing the electronic message to identify a message subject, a message date and a message set of correspondents of the electronic message;
   identifying a first subset of the plurality of threads comprising:
   a thread subject that matches the message subject of the electronic message; the subject defining a first search criteria from which a plurality of electronic messages are searched, the plurality of electronic messages comprising the first subset;
   a thread date range within which the message date of the electronic message is located, the thread date range defining a second search criteria from which the plurality of electronic messages are searched;
   identifying a second subset of threads, the second subset comprising a subset of the first subset, that comprise the same correspondents as the set of correspondents of the electronic message;
   responsive to the second subset comprising a single thread, adding the electronic message to the thread; and
   displaying on the computer display a representation of the single thread including the electronic message.

2. The method of claim 1, wherein responsive to the second subset comprising a plurality of threads, merging the plurality of threads into a single thread and adding the electronic message to the merged thread.

3. The method of claim 1, wherein responsive to the second subset comprising no threads, creating a new thread with the electronic message making up the new thread.

4. The method of claim 3, wherein the new thread is classified as a related thread with respect to each of the threads identified in the first subset.

5. The method of claim 4, wherein the new thread is classified as a reduced thread with respect to the threads of the first subset that comprise more correspondents than the set of correspondents of the electronic message.

6. The method of claim 4, wherein the new thread is classified as an expanded thread with respect to the threads of the first subset that comprise a subset of the correspondents found within the set of correspondents of the electronic message.

7. The method of claim 1, wherein the subject parsed from the electronic message is normalized.

8. The method of claim 1, wherein the thread date range comprises an interval of time prior to a first message of a thread.

9. The method of claim 1, wherein the thread date range comprises an interval of time after the last message of a thread.

10. A method for grouping an electronic message into one of a plurality of threads, comprising:
    receiving a plurality of search criteria comprising a subject, a date range and set of correspondents;
    performing a search query on a plurality of electronic messages within a storage device, the search query being based on the plurality of search criteria;
    identifying the electronic message stored within the storage device based on the subject, the date range and the set of correspondents;
    retrieving the electronic message from the storage device, the storage device being coupled via a network to a computer having a computer display;
    parsing the electronic message to identify a thread identifying header and a set of message correspondents;
    identifying a first subset of the plurality of existing threads that match the thread identifying header, the thread identifying header comprising a subject line and a temporal characteristic related to a date range in which electronic communication occurred, both the subject line and the temporal characteristic are search criteria from which a plurality of electronic messages are searched, the plurality of electronic messages comprising the first subset;

identifying a second subset of threads, the second subset comprising a subset of the first subset, that comprise the same correspondents as the set of message correspondents of the electronic message;

responsive to the second subset comprising a single thread, adding the electronic message to the thread; and displaying on the computer display a representation of the single thread including the electronic message.

11. The method of claim 10, wherein responsive to the second subset comprising no threads, creating a new thread with the electronic message making up the new thread.

12. The method of claim 11, wherein the new thread is classified as a related thread with respect to each of the threads identified in the first subset.

13. The method of claim 12, wherein the new thread is classified as a reduced thread with respect to the threads of the first subset that comprise more correspondents than the set of correspondents of the electronic message.

14. The method of claim 12, wherein the new thread is classified as an expanded thread with respect to the threads of the first subset that comprise a subset of the correspondents found within the set of correspondents of the electronic message.

15. The method of claim 10, wherein the thread identifying header identifies one or more messages that precede the electronic message in a thread.

16. A method for grouping an electronic message into one of a plurality of existing threads, comprising:

receiving a plurality of search criteria comprising a subject, a date range and set of correspondents;

performing a search query on a plurality of electronic messages within a storage device, the search query being based on the plurality of search criteria;

identifying the electronic message stored within the storage device based on the subject, the date range and the set of correspondents;

retrieving the electronic message from the storage device, the storage device being coupled via a network to a computer having a computer display;

parsing the electronic message to identify one or more header fields;

responsive to identifying a thread identifying header:
comparing the thread identifying header with each of the plurality of existing threads to identify a first set of the plurality of existing threads that matches the thread identifying header;
comparing a first set of correspondents of the electronic message with a second set of correspondents of each set of the first set of threads to identify a first preferred thread with the same set of correspondents;
adding the electronic message to the first preferred thread responsive to not identifying a thread identifying header:
comparing a message subject and a message date of the electronic message with a thread subject and a thread date range of each of the plurality of existing threads to identify a second set of the plurality of existing threads to which the electronic message may belong;
comparing a set of message correspondents of the electronic message with a set of thread correspondents of each set of the second set of threads to identify a second preferred thread with the same set of correspondents;
adding the electronic message to the second preferred thread with the same set of correspondents; and displaying on the computer display a representation of the single thread including the electronic message.

17. The method of claim 16, wherein the thread identifying header identifies one or more messages that precede the electronic message in a first preferred thread.

* * * * *